US012297314B2

(12) United States Patent
Lee et al.

(10) Patent No.: US 12,297,314 B2
(45) Date of Patent: May 13, 2025

(54) CURABLE COMPOSITION

(71) Applicant: LG Chem, Ltd., Seoul (KR)

(72) Inventors: Jeong Hyun Lee, Daejeon (KR); Yang Gu Kang, Daejeon (KR); Eun Suk Park, Daejeon (KR); Hyoung Sook Park, Daejeon (KR); Young Jo Yang, Daejeon (KR)

(73) Assignee: LG Chem, Ltd., Seoul (KR)

( * ) Notice: Subject to any disclaimer, the term of this patent is extended or adjusted under 35 U.S.C. 154(b) by 700 days.

(21) Appl. No.: 17/613,209

(22) PCT Filed: Sep. 9, 2020

(86) PCT No.: PCT/KR2020/012144
§ 371 (c)(1),
(2) Date: Nov. 22, 2021

(87) PCT Pub. No.: WO2021/049863
PCT Pub. Date: Mar. 18, 2021

(65) Prior Publication Data
US 2022/0227914 A1    Jul. 21, 2022

(30) Foreign Application Priority Data
Sep. 9, 2019    (KR) .................. 10-2019-0111236

(51) Int. Cl.
| C08G 18/10 | (2006.01) |
| C08G 18/24 | (2006.01) |
| C08G 18/42 | (2006.01) |
| C08G 18/73 | (2006.01) |
| C08K 3/22 | (2006.01) |
| C08K 5/37 | (2006.01) |
| H01M 50/204 | (2021.01) |

(52) U.S. Cl.
CPC ........... *C08G 18/10* (2013.01); *C08G 18/246* (2013.01); *C08G 18/4277* (2013.01); *C08G 18/73* (2013.01); *C08K 3/22* (2013.01); *C08K 5/37* (2013.01); *H01M 50/204* (2021.01); *C08K 2003/2227* (2013.01); *C08K 2201/003* (2013.01); *C08K 2201/014* (2013.01); *H01M 2220/20* (2013.01)

(58) Field of Classification Search
CPC ........ C08G 18/10; C08G 18/24; C08G 18/42; C08G 18/73; C08K 3/22; C08K 5/37
USPC ........................................................ 524/589
See application file for complete search history.

(56) References Cited

U.S. PATENT DOCUMENTS

| 4,760,101 | A | 7/1988 | Fechter et al. |
| 6,348,121 | B1 | 2/2002 | Schoener et al. |
| 8,133,953 | B2 | 3/2012 | Van Engelen et al. |
| 2006/0264522 | A1 | 11/2006 | Nishikawa et al. |
| 2008/0234410 | A1 | 9/2008 | Van Engelen et al. |
| 2012/0107519 | A1 | 5/2012 | Klinkenberg et al. |
| 2012/0196977 | A1 | 8/2012 | Tomiyama et al. |
| 2012/0258306 | A1 | 10/2012 | Kinzelmann et al. |
| 2015/0017336 | A1 | 1/2015 | Scherer et al. |
| 2018/0076493 | A1 | 3/2018 | Park et al. |
| 2018/0155590 | A1 | 6/2018 | Schmatloch et al. |
| 2018/0208815 | A1 | 7/2018 | Araki |
| 2019/0002617 | A1* | 1/2019 | Kotani .................. C09J 7/385 |
| 2020/0207980 | A1 | 7/2020 | Burckhardt et al. |
| 2020/0277433 | A1 | 9/2020 | Cho et al. |
| 2021/0139756 | A1 | 5/2021 | Zhu et al. |
| 2021/0371620 | A1 | 12/2021 | Kong et al. |
| 2021/0395432 | A1 | 12/2021 | Feng et al. |
| 2022/0073671 | A1 | 3/2022 | Lee et al. |
| 2022/0073796 | A1 | 3/2022 | Zhu et al. |
| 2022/0227914 | A1 | 7/2022 | Lee et al. |
| 2022/0306796 | A1 | 9/2022 | Lee et al. |

FOREIGN PATENT DOCUMENTS

| CN | 102361899 A | 2/2012 |
| CN | 102533200 A | 7/2012 |
| CN | 104371632 A | 2/2015 |
| CN | 104487470 A | 4/2015 |
| CN | 105778847 A | 7/2016 |
| CN | 107384277 A | 11/2017 |
| CN | 107431147 A | 12/2017 |
| CN | 107660218 A | 2/2018 |
| CN | 107955574 A | 4/2018 |
| CN | 108164992 A | 6/2018 |
| DE | 102009045488 A1 | 4/2011 |
| EP | 0158893 A1 | 10/1985 |
| EP | 1095956 A2 | 5/2001 |
| EP | 2481583 A2 | 8/2012 |
| JP | 2001270929 A | 10/2001 |
| JP | 2008291172 A | 12/2008 |

(Continued)

OTHER PUBLICATIONS

International Search Report for Application No. PCT/KR2020/012144 mailed Dec. 11, 2020, pp. 1-3.
Extended Search Report for European Application No. 20863309.9 dated Jan. 19, 2022.6 pgs.
International Search Report for Application No. PCT/KR2020/012140, mailed Dec. 18, 2020, 3 pages.
International Search Report for Application No. PCT/KR2020/012142 mailed Dec. 11, 2020, 3 Pages.

(Continued)

*Primary Examiner* — Deve V Hall
(74) *Attorney, Agent, or Firm* — Lerner David LLP

(57) ABSTRACT

A curable composition capable of securing a waiting time after curing starts, and efficiently controlling the relevant waiting time is provided. The curable composition also controls a curing rate after the waiting time to suit the application. A battery module, a battery pack or an automobile comprising a cured product of the curable composition is also provided.

14 Claims, 2 Drawing Sheets

(56) References Cited

FOREIGN PATENT DOCUMENTS

| | | | |
|---|---|---|---|
| JP | 2010001349 A | 1/2010 | |
| JP | 2010222548 A | 10/2010 | |
| JP | 2011079893 A | 4/2011 | |
| JP | 2011168754 A | 9/2011 | |
| JP | 2012521877 A | 9/2012 | |
| JP | 2014111686 A | 6/2014 | |
| JP | 2017078132 A | 4/2017 | |
| JP | 2018206604 A | 12/2018 | |
| JP | 2019065099 A | 4/2019 | |
| JP | 2019518098 A | 6/2019 | |
| JP | 2020532628 A | 11/2020 | |
| JP | 2022521949 A | 4/2022 | |
| JP | 2022532684 A | 7/2022 | |
| JP | 2022534205 A | 7/2022 | |
| KR | 2012-0022723 | * | 3/2012 |
| KR | 20120022723 A | 3/2012 | |
| KR | 101304013 B1 | 9/2013 | |
| KR | 20140131934 A | 11/2014 | |
| KR | 20150035698 A | 4/2015 | |
| KR | 20160105354 A | 9/2016 | |
| KR | 20160105358 A | 9/2016 | |
| KR | 20190029924 A | 3/2019 | |
| WO | WO-2014017328 A1 * | 1/2014 | ............ B32B 27/08 |
| WO | 2017014192 A1 | 1/2017 | |
| WO | 2019002538 A1 | 1/2019 | |
| WO | 2019156737 A1 | 8/2019 | |
| WO | 2020176437 A1 | 9/2020 | |
| WO | 2020236440 A1 | 11/2020 | |

OTHER PUBLICATIONS

Search Report dated Jun. 3, 2022 from the Office Action for Chinese Application No. 202080008531.9 issued Jun. 8, 2022, 3 pages.
Search Report dated Nov. 10, 2022 from the Office Action for Chinese Application No. 202080036989.5 issued Nov. 16, 2022, pp. 1-3.
Wondu et al., Thermal Conductivity and Mechanical Properties of Thermoplastic Polyurethane-/Silane-Modified Al2O3 Composite Fabricated via Melt Compounding, Polymers 2019, 11, 1103.

* cited by examiner

[Figure 1]
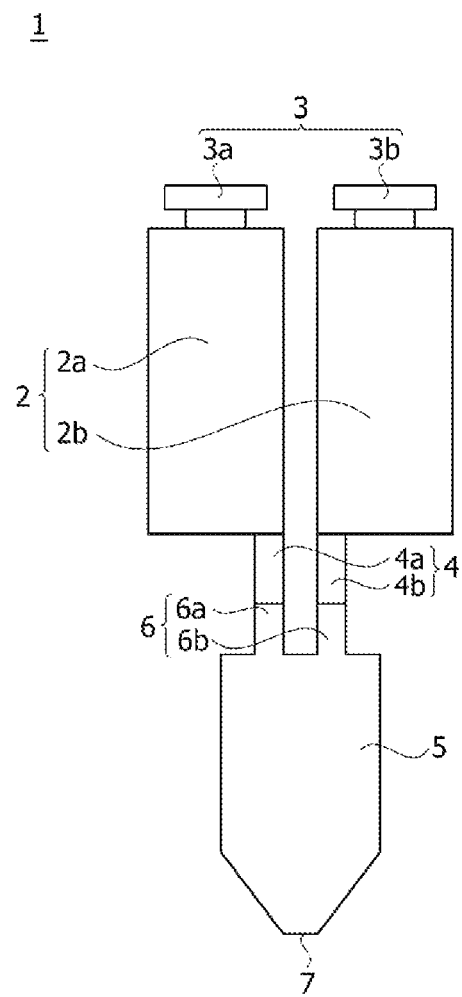

[Figure 2]
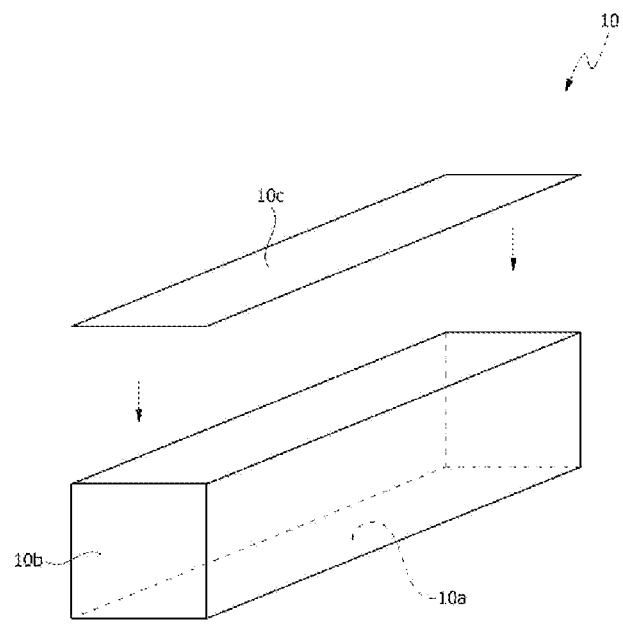
[Figure 3]
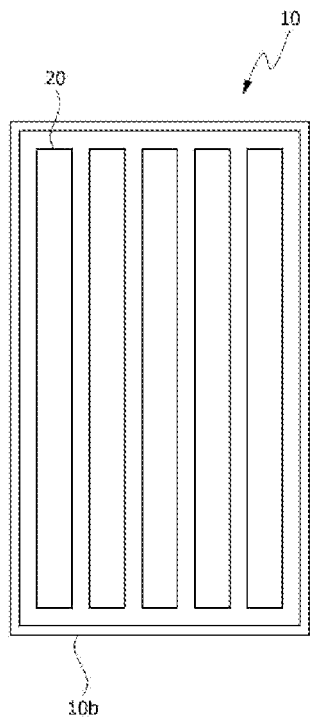

CURABLE COMPOSITION

CROSS-REFERENCE TO RELATED APPLICATIONS

This application is a national phase entry under 35 U.S.C. § 371 of International Application No. PCT/KR2020/012144, filed on Sep. 9, 2020, which claims priority from Korean Patent Application No. 10-2019-0111236 filed on Sep. 9, 2019, the disclosures of which are incorporated herein by reference in their entirety.

TECHNICAL FIELD

The present application relates to a curable composition, a battery module, a battery pack, and an automobile.

BACKGROUND ART

Curing rates and the cure progress aspects of curable compositions need to be adjusted depending on the application. For example, depending on the application, the curable composition may require a certain waiting time after the curing start point.

In this specification, the term curing start point means a time point that the curable composition is exposed to a state and environment where curing can proceed, and the term waiting time means a time that it has been exposed to a state and environment where the curing can proceed, but the degree of curing is delayed to the intended level.

For example, Patent Document 1 discloses a content of forming a resin layer in contact with a battery cell and a module case by using a curable composition. Among the methods of forming the resin layer in Patent Document 1, a method of injecting and curing a mixture of a two-component curable composition into a battery module using an injection device such as a nozzle is included. When the two-component curable composition is mixed, the main agent resin and the curing agent of the main agent resin are physically contacted, so that the mixing point is generally the curing start point, and when the curing reaction proceeds, the viscosity of the composition usually increases. In the method of forming the resin layer as in Patent Document 1, the composition is injected into a tube-shaped injection device having a relatively small diameter such as a nozzle, so that a load is applied to the injection device when the viscosity of the composition increases. Therefore, in this case, the waiting time is required so that the viscosity can be maintained at a low level, at least until the composition is injected into the module.

In addition, depending on the production line of the battery module, in the case where the pre-process such as a purging process is performed before the injection of the composition, the two-component composition is mixed and then the mixed state needs to be maintained in the device until the pre-process is completed, so that the need for waiting time in this case further increases.

However, it is not easy to delay curing in the state where the curable composition is exposed to conditions capable of curing.

In addition, in the manufacturing process of the battery module, an inspection process of a battery cell or module is performed, where in this process, the top and bottom of the battery module is optionally reversed. Therefore, even when the top and bottom of the battery module is reversed in the inspection step, the viscosity must be increased so that the composition injected into the module does not flow down or deviate from the position and the back discharge does not occur, in which the once injected composition is discharged back to the inlet.

When the back discharge occurs during the manufacturing process of the battery module, a process of removing the back-discharged composition needs to be performed. In this case, if the curing of the composition does not proceed too much or, conversely, if it proceeds too much, it is difficult to remove the back-discharged composition. Accordingly, there is also a need to control the curing rate so that a degree of curing may be secured at a level that is easily removed at the point of removal of the back-discharged composition in the processing procedure of the module.

In order that an appropriate degree of curing in the inspection process and/or the removal process of the back-discharged composition as above is secured and the manufacturing process of the battery module more efficiently proceeds, it is advantageous that the curing proceeds quickly after the waiting time has elapsed.

However, it is not easy to secure a certain level of waiting time by delaying curing after the curing start point of the curable composition. In addition, even if the curable composition is formulated so that curing occurs slowly, the waiting time can be secured to some extent, but in this case, it is not possible to make the curing proceed rapidly after the waiting time has elapsed.

In addition, the curable composition for forming a resin layer disclosed in Patent Document 1 is a high filling system in which an excessive amount of filler is blended in the resin layer in order to ensure high thermal conductivity. In the case of the curable composition in the high filling system, the amounts of components (the main agent and the curing agent, etc.) that perform the curing reaction are relatively small, and the contact probability of the components is affected by the high filled filler. In this case, it is more difficult to control the curing rate, and it is a difficult problem to secure a waiting time or to make curing proceed rapidly after the waiting time.

In addition, the curable composition for forming a resin layer disclosed in Patent Document 1 needs to be formulated to have a relatively low viscosity for injection. In this case, it is more difficult to control the contact probability of the components (the main agent and the curing agent, etc.) that perform the curing reaction. Even in this case, it is more difficult to control the curing rate, and it is a difficult problem to secure a waiting time or to make curing proceed rapidly after the waiting time.

(Patent Document 1) Korean Laid-Open Patent Publication No. 2016-0105354

DISCLOSURE

Technical Problem

The present application is intended to provide a curable composition. The present application is intended to provide a curable composition capable of securing a waiting time, freely adjusting the relevant waiting time depending on the application, and relatively quickly controlling the curing rate after the waiting time has elapsed.

The present application is intended to provide a curable composition capable of securing the above properties even when the curable composition is a formulation having a relatively low viscosity and/or a formulation comprising an excessive amount of filler.

The present application is also intended to provide a battery module, a battery pack, and/or an automobile comprising the curable composition or a cured product thereof.

Technical Solution

In the case where the measured temperature affects the result among physical properties mentioned in this specification, the relevant physical properties are physical properties measured at room temperature, unless otherwise specified. The term room temperature is a natural temperature without warming and cooling, which is usually a temperature within the range of about 10° C. to 30° C., or a temperature of about 23° C. or about 25° C. or so. In addition, unless specifically stated otherwise in this specification, the unit of temperature is ° C.

In the case where the measured pressure affects the result among physical properties mentioned in this specification, the relevant physical properties are physical properties measured at normal pressure, unless otherwise specified. The term normal pressure is a natural pressure without being pressurized and depressurized, where usually about 1 atmosphere or so is referred to as normal pressure.

Unless otherwise specified, the viscosity mentioned in this specification means a result measured at a temperature of about 25° C. under conditions of a torque of about 90% and a shear rate of about 100 rpm, using a Brookfield HB type viscometer.

Unless otherwise specified, the hardness mentioned in this specification is Shore A hardness measured using an Asker durometer according to ASTM D 2240 standard, which is hardness measured in the thickness direction for a specimen in the form of a film having a thickness of approximately 4 mm or so.

In this specification, the term curing start point means a time point when the curable composition begins to be exposed to an environment in which curing is possible. For example, in the case of a room temperature curable composition, a time point when the composition begins to be exposed to room temperature; in the case of a moisture curable composition, a time point when the composition begins to be exposed to the moisture to the extent that curing is possible; in the case of a thermosetting composition, a time point when heat begins to be applied to the composition to the extent that curing is possible; and in the case of a photo-curable composition, a time point when light begins to be applied to the composition to the extent that curing is possible are the curing start points. The two-component curable composition is usually composed of a main agent composition and a curing agent composition that are physically separated, where the curing does not proceed even if it is exposed to the above conditions before the main agent and curing agent compositions are mixed. Therefore, the curing start point of the two-component curable composition is the time point when the main agent and curing agent compositions are exposed to the conditions in a state where they are mixed. For example, in the case of a room temperature curable two-component composition, if the main agent and curing agent compositions have been mixed at room temperature, the mixing time point is the curing start point, and if the mixing is performed at a temperature other than room temperature and after mixing the mixture is exposed to room temperature, the time point of exposure to room temperature becomes the curing start point.

In this specification, the term curing delay means a state where the curable composition has been exposed to an environment in which curing is possible, but the curing reaction does not occur or the degree of curing reaction is low to the extent that the intended level of viscosity increase does not occur.

In this specification, the term waiting time is a time from the curing start point to the end of the curing delay state.

The present application relates to a curable composition. Using the curable composition of the present application, it is possible to secure a waiting time of the curable composition suitable for use, and after the waiting time is over, it is possible to induce rapid curing at the intended level.

If the curable composition of the present application is used, the device may not be loaded, for example, even in the case where the curable composition is injected using the device in the form of a tube having a relatively small diameter such as a nozzle and/or the case where the injection is performed in a relatively narrow space. For example, in the manufacturing process of the battery module disclosed in Patent Document 1, if the injection of the curable composition into the module case is performed in the state where the battery cell is mounted in the module case, the curable composition is injected to a narrow space inside the module case. In this case, a load may be applied to the device due to the generation of internal pressure, but if the curable composition of the present application is used, the load is not applied to the device or is minimized even in this case.

The curable composition of the present application may be suitably used for various applications, which may be suitably used, for example, for manufacturing a battery module or a battery pack (particularly, manufacturing a battery module or pack disclosed in Patent Document 1). In this case, the curable composition of the present application may be injected into the case of the battery module and used to fix the battery cell in the battery module by contacting one or more battery cells present in the battery module.

The curable composition of the present application may be a one-component composition or a two-component composition. The two-component composition usually comprises a main agent composition and a curing agent composition which are physically separated. Therefore, in this specification, the description of the curable composition may be the content of the one-component curable composition, the content of the main agent or curing agent composition in the two-component curable composition, or the mixture or reactant of the main agent and curing agent compositions of the two-component curable composition.

The curable composition of the present application may be, for example, a urethane composition. The term urethane composition may mean a composition capable of being cured to form a polyurethane.

The curable composition of the present application may be a room temperature curing type, a room temperature moisture curing type, a moisture curing type, a heat curing type, or a photo-curing type. When the curable composition is applied to the manufacture of the battery module shown in Patent Document 1, the curable composition may be formulated to a room temperature curing type.

The curable composition of the present application may comprise at least a polyol, a reaction inhibitor, a catalyst and a filler.

The curable composition of the present application exhibits an appropriate waiting time after the curing start point. Thus, for example, the curable composition may have a required time ($V_{t2}$), which becomes a viscosity twice as high as the initial viscosity (that is, when the initial viscosity is $V_1$, the time required to show the viscosity of $2V_1$ from the curing start point), of 15 minutes or more.

The term initial viscosity means the viscosity of the curable composition at the curing start point. Practically, it may be technically difficult to measure the viscosity of the curable composition immediately at the curing start point, so that the viscosity measured within about 3 minutes, within about 2.5 minutes, within about 1.5 minutes or within about 1 minute from the curing start point may also be defined as the initial viscosity, and the viscosity measured after about 10 seconds, about 20 seconds, about 30 seconds or about 60 seconds from the curing start point may also be defined as the initial viscosity.

In general, the viscosity of the curable composition increases as the curing reaction proceeds, where the curable composition of the present application may exhibit a waiting time in which the required time ($V_{t2}$) is 15 minutes or more. The required time ($V_{t2}$) may be controlled to a desired level, if necessary. For example, the required time ($V_{t2}$) may be further adjusted in a range of about 17 minutes or more, 19 minutes or more, 21 minutes or more, 23 minutes or more, 25 minutes or more, 27 minutes or more, 29 minutes or more, 31 minutes or more, 33 minutes or more, 35 minutes or more, 37 minutes or more, 39 minutes or more, 41 minutes or more, 43 minutes or more, 45 minutes or more, 47 minutes or more, 49 minutes or more, 51 minutes or more, 53 minutes or more, 55 minutes or more, 57 minutes or more, 59 minutes or more, 61 minutes or more, 63 minutes or more, 65 minutes or more, or 67 minutes or more and/or in a range of 100 minutes or less, 98 minutes or less, 96 minutes or less, 94 minutes or less, 92 minutes or less, 90 minutes or less, 88 minutes or less, 86 minutes or less, 84 minutes or less, 82 minutes or less, 80 minutes or less, 78 minutes or less, 76 minutes or less, 74 minutes or less, 72 minutes or less, 70 minutes or less, 68 minutes or less, 66 minutes or less, 64 minutes or less, 62 minutes or less, 60 minutes or less, 58 minutes or less, 56 minutes or less, 54 minutes or less, 52 minutes or less, 50 minutes or less, 48 minutes or less, 46 minutes or less, 44 minutes or less, 42 minutes or less, 40 minutes or less, 38 minutes or less, 36 minutes or less, 34 minutes or less, 32 minutes or less, 30 minutes or less, 28 minutes or less, 26 minutes or less, 24 minutes or less, 22 minutes or less, or 20 minutes or less.

For example, the curable composition having the required time ($Vt_2$) adjusted within the above range may be suitably applied to the manufacture of the battery module disclosed in Patent Document 1. The curable composition exhibiting such a waiting time may be applied to the manufacturing process to reduce the load applied to the device, and secure suitable work processability (for example, secure a suitable process tact time).

In another example, the curable composition may have a Shore A hardness confirmation time ($Ht_i$) in a range of 40 minutes to 300 minutes. The term Shore A hardness confirmation time ($Ht_i$) is a time required from the curing start point until the Shore A hardness of the curable composition starts to be confirmed. As described above, in general, the curable composition starts to increase the viscosity from the start of curing, and accordingly, the hardness increases. However, since the hardness is very low in a state where the degree of curing is low, the hardness of the curable composition cannot be confirmed using the equipment. Therefore, in order to measure the hardness of the curable composition, the curing needs to proceed above a certain level, and for example, the fact that the Shore A hardness confirmation time ($Ht_i$) is 40 minutes means that from 40 minutes after the curing start point, the hardness starts to be measured in the equipment. Therefore, the fact that the required time ($Ht_i$) is long may mean that the waiting time is long, and conversely, the fact that it is short may mean that the curing rate is fast after the waiting time.

The confirmation time ($Ht_i$) may also be adjusted to a desired level. For example, the required time ($Ht_i$) may also further be adjusted in a range of about 41 minutes or more, 42 minutes or more, 43 minutes or more, 44 minutes or more, 45 minutes or more, 46 minutes or more, 47 minutes or more, 48 minutes or more, 49 minutes or more, 50 minutes or more, 55 minutes or more, 60 minutes or more, 65 minutes or more, 70 minutes or more, 75 minutes or more, 80 minutes or more, 85 minutes or more, 90 minutes or more, 95 minutes or more, 100 minutes or more, 110 minutes or more, 120 minutes or more, 130 minutes or more, 140 minutes or more, 150 minutes or more, 160 minutes or more, 170 minutes or more, 180 minutes or more, 190 minutes or more, or 200 minutes or more and/or in a range of 200 minutes or less, 190 minutes or less, 180 minutes or less, 170 minutes or less, 160 minutes or less, 150 minutes or less, 140 minutes or less, 130 minutes or less, 120 minutes or less, 110 minutes or less, 100 minutes or less, 90 minutes or less, 80 minutes or less, 70 minutes or less, 60 minutes or less, or 50 minutes or less.

For example, the curable composition having the confirmation time ($Ht_i$) adjusted within the above range may be suitably applied to the manufacture of the battery module disclosed in Patent Document 1. Such a curable composition may be applied to the manufacturing process to reduce the load applied to the device, and secure suitable work processability (for example, secure a suitable process tact time).

In one example, the difference ($H_{ti}-V_{t2}$) between the required time ($Vt_2$) and the confirmation time ($H_{ti}$) in the curable composition may be in a range of 25 minutes to 300 minutes. The difference ($H_{ti}-V_{t2}$) may also be controlled to a desired level as needed. For example, the difference ($H_{ti}-V_{t2}$) may be further adjusted in a range of about 27 minutes or more, 29 minutes or more, 31 minutes or more, 33 minutes or more, 35 minutes or more, 37 minutes or more, 39 minutes or more, 41 minutes or more, 43 minutes or more, 45 minutes or more, 47 minutes or more, 49 minutes or more, 51 minutes or more, 53 minutes or more, 55 minutes or more, 57 minutes or more, 59 minutes or more, 61 minutes or more, 63 minutes or more, 65 minutes or more, 67 minutes or more, 70 minutes or more, 80 minutes or more, 90 minutes or more, 100 minutes or more, 110 minutes or more, 120 minutes or more, or 130 minutes or more and/or in a range of 250 minutes or less, 200 minutes or less, 150 minutes or less, 100 minutes or less, 98 minutes or less, 96 minutes or less, 94 minutes or less, 92 minutes or less, 90 minutes or less, 88 minutes or less, 86 minutes or less, 84 minutes or less, 82 minutes or less, 80 minutes or less, 78 minutes or less, 76 minutes or less, 74 minutes or less, 72 minutes or less, 70 minutes or less, 68 minutes or less, 66 minutes or less, 64 minutes or less, 62 minutes or less, 60 minutes or less, 58 minutes or less, 56 minutes or less, 54 minutes or less, 52 minutes or less, 50 minutes or less, 48 minutes or less, 46 minutes or less, 44 minutes or less, 42 minutes or less, 40 minutes or less, 38 minutes or less, 36 minutes or less, 34 minutes or less, 32 minutes or less, or 30 minutes or less.

For example, the curable composition having the difference ($Ht_i-V_{t2}$) adjusted within the above range may be suitably applied to the manufacture of the battery module disclosed in Patent Document 1. Such a curable composition may be applied to the manufacturing process to reduce the load applied to the device, and secure suitable work processability (for example, secure a suitable process tact time).

In one example, the curable composition may have a Shore A hardness 40 confirmation time ($Ht_{40}$) in a range of 40 minutes to 300 minutes. The term Shore A hardness 40 confirmation time ($Ht_{40}$) is a time required from the curing start point until the Shore A hardness of the curable composition starts to be confirmed as 40. The required time ($Ht_{40}$) may also be adjusted to a desired level according to the purpose. For example, the required time ($Ht_{40}$) may also further be adjusted in a range of 290 minutes or less, 280 minutes or less, 270 minutes or less, 260 minutes or less, 250 minutes or less, 240 minutes or less, 230 minutes or less, 220 minutes or less, 210 minutes or less, 200 minutes or less, 190 minutes or less, 180 minutes or less, 170 minutes or less, 160 minutes or less, 150 minutes or less, 140 minutes or less, 130 minutes or less, 120 minutes or less, 118 minutes or less, 116 minutes or less, 114 minutes or less, 112 minutes or less, 100 minutes or less, 90 minutes or less, 80 minutes or less, 70 minutes or less, 60 minutes or less, or 50 minutes or less and/or in a range of about 45 minutes or more, about 50 minutes or more, 52 minutes or more, 54 minutes or more, 56 minutes or more, 58 minutes or more, about 60 minutes or more, 70 minutes or more, 80 minutes or more, 90 minutes or more, 100 minutes or more, 110 minutes or more, 120 minutes or more, 130 minutes or more, 140 minutes or more, 150 minutes or more, 160 minutes or more, 170 minutes or more, 180 minutes or more, 190 minutes or more, 200 minutes or more, 210 minutes or more, 220 minutes or more, 230 minutes or more, 240 minutes or more, 250 minutes or more, 260 minutes or more, 270 minutes or more, 280 minutes or more, or 290 minutes or more.

For example, the curable composition having the confirmation time ($Ht_{40}$) adjusted within the above range may be suitably applied to the manufacture of the battery module disclosed in Patent Document 1. The curable composition exhibiting such a waiting time may be applied to the manufacturing process to reduce the load applied to the equipment, and secure suitable work processability (for example, secure a suitable process tact time).

In one example, the difference ($H_{t40}-H_{ti}$) between the confirmation times $H_{ti}$ and $H_{t40}$ may be in a range of 1 minute to 30 minutes. The difference ($H_{t40}-H_{ti}$) may also be controlled to a desired level as needed. For example, the difference ($H_{t40}-H_{ti}$) may be further adjusted in a range of about 2 minutes or more, 3 minutes or more, 4 minutes or more, or 4.5 minutes or more and/or in a range of 25 minutes or less, 20 minutes or less, 15 minutes or less, 10 minutes or less, 9 minutes or less, 8 minutes or less, 7 minutes or less, 6 minutes or less, or 5.5 minutes or less.

It may mean that the curable composition having the difference ($H_{t40}-H_{ti}$) of the confirmation time causes rapid curing after the waiting time, and such a curable composition may be suitably applied to, for example, manufacturing a battery module disclosed in Patent Document 1. Such a curable composition may be applied to the manufacturing process to reduce the load applied to the equipment, and secure suitable work processability (for example, secure a suitable process tact time).

In one example, the curable composition may have a Shore A hardness 90 confirmation time ($Ht_{90}$) in a range of 70 minutes to 400 minutes. The term Shore A hardness 90 confirmation time ($Ht_{90}$) is a time required from the curing start point until the Shore A hardness of the curable composition starts to be confirmed as 90. The required time ($Ht_{90}$) may also be adjusted to a desired level according to the purpose. For example, the required time ($Ht_{90}$) may be further adjusted in a range of 75 minutes or more, 80 minutes or more, 82 minutes or more, 84 minutes or more, 86 minutes or more, 88 minutes or more, about 90 minutes or more, 100 minutes or more, 150 minutes or more, 200 minutes or more, or 250 minutes or more and/or in a range of 350 minutes or less, 300 minutes or less, 250 minutes or less, 200 minutes or less, about 178 minutes or less, 176 minutes or less, 174 minutes or less, about 172 minutes or less, 165 minutes or less, 160 minutes or less, 155 minutes or less, 150 minutes or less, 145 minutes or less, 140 minutes or less, 135 minutes or less, 130 minutes or less, 125 minutes or less, 120 minutes or less, 115 minutes or less, 110 minutes or less, 105 minutes or less, 100 minutes or less, 90 minutes or less, or 80 minutes or less.

For example, the curable composition having the confirmation time ($H_{t90}$) adjusted within the above range may be suitably applied to the manufacture of the battery module disclosed in Patent Document 1. The curable composition exhibiting such a waiting time may be applied to the manufacturing process to reduce the load applied to the equipment, and secure suitable work processability (for example, secure a suitable process tact time).

In one example, the difference ($H_{t90}-H_{t40}$) between the confirmation times $H_{t90}$ and $H_{t40}$ in the curable composition may be 200 minutes or less. The difference ($H_{t90}-H_{t40}$) may be further adjusted in a range of 190 minutes or less, 180 minutes or less, 170 minutes or less, 160 minutes or less, 150 minutes or less, 140 minutes or less, 130 minutes or less, 120 minutes or less, 110 minutes or less, 100 minutes or less, 90 minutes or less, 80 minutes or less, 70 minutes or less, 68 minutes or less, 66 minutes or less, about 64 minutes or less, 60 minutes or less, 55 minutes or less, 50 minutes or less or 45 minutes or less, or 40 minutes or less and/or in a range of 10 minutes or more, 15 minutes or more, 20 minutes or more, 25 minutes or more, 30 minutes or more, 35 minutes or more, 40 minutes or more, 45 minutes or more, 50 minutes or more, 55 minutes or more, 60 minutes or more, 65 minutes or more, 70 minutes or more, 75 minutes or more, 80 minutes or more, 85 minutes or more, 90 minutes or more, 95 minutes or more, 100 minutes or more, 110 minutes or more, 120 minutes or more, 130 minutes or more, 140 minutes or more, 150 minutes or more, 160 minutes or more, 170 minutes or more, 180 minutes or more, or 190 minutes or more.

It may mean that the curable composition having the difference ($H_{t90}-H_{t40}$) of the confirmation time causes rapid curing after the waiting time, and such a curable composition may be suitably applied to the manufacture of a battery module disclosed in Patent Document 1, for example. Such a curable composition may be applied to the manufacturing process to reduce the load applied to the equipment, and secure suitable work processability (for example, secure a suitable process tact time).

In one example, the curable composition of the present application may have a low initial load value (Li). Assuming that the curable composition is injected by a device of a tube with a relatively narrow diameter, such as a nozzle, and the like, the term load value is one obtained by quantifying the load applied to the device during the process, which a value measured in the manner described below. In addition, the term initial load value is a value obtained by quantifying the load value of the curable composition at the curing start point. The unit of the load value is kgf.

The curable composition of the present application may have an initial load value (Li) in a range of 10 to 35 kgf. In another example, the initial load value (Li) may be further adjusted in a range of about 10 kgf or more, 11 kgf or more, 12 kgf or more, 13 kgf or more, 14 kgf or more, 15 kgf or more, 16 kgf or more, 17 kgf or more, 18 kgf or more, 19 kgf or more, 20 kgf or more, 21 kgf or more, 22 kgf or more, 23 kgf or more, 24 kgf or more, 25 kgf or more, 26 kgf or more, 27 kgf or more, or 28 kgf or more and/or in a range of about 35 kgf or less, 34 kgf or less, 33 kgf or less, 32 kgf or less, 31 kgf or less, 30 kgf or less, 29 kgf or less, 28 kgf or less, 27 kgf or less, 26 kgf or less, 25 kgf or less, 24 kgf or less, 23 kgf or less, or 22 kgf or less.

In the present application, the curable composition may also have a load value change rate according to the following equation 1 in a range of 1 to 2.

$$\text{Load value change rate} = Lf/Li \qquad \text{[Equation 1]}$$

In Equation 1, Li is the initial load value, and Lf is the load value at a time of 30 minutes after the curing start point.

The fact that the load value change rate is high means that the waiting time is short, and conversely, the fact that the load value change rate is low means that the waiting time is long.

In another example, the load value change rate (Lf/Li) may also be 1.9 or less, 1.8 or less, 1.7 or less, 1.6 or less, 1.5 or less, 1.4 or less, 1.3 or less, 1.2 or less, or 1.1 or less or so.

In addition, the load value (Lf) may be about 50 kgf or less. In another example, the load value (Lf) may also further be adjusted in a range of about 20 kgf or more, 22 kgf or more, 24 kgf or more, 26 kgf or more, 28 kgf or more, 30 kgf or more, 32 kgf or more, 34 kgf or more, 36 kgf or more, 38 kgf or more, 40 kgf or more, 42 kgf or more, or 44 kgf or more and/or in a range of about 48 kgf or less, 46 kgf or less, 44 kgf or less, 42 kgf or less, 40 kgf or less, 38 kgf or less, 36 kgf or less, 34 kgf or less, 32 kgf or less, 30 kgf or less, 28 kgf or less, or 26 kgf or less.

FIG. 1 is a diagram schematically showing the constitution of an apparatus (1) for measuring the load value. As shown in FIG. 1, in the process that the curable composition introduced into the cartridges (2, 2a, 2b), pressurized with the pressurizing means (3, 3a, 3b), and discharged via the mixer, the load value can be defined as the maximum force applied to the pressurizing means (3, 3a, 3b).

For example, in relation to the load values Li and Lf, the curable composition in the cartridges (2, 2a, 2b) is pressurized at a constant speed of about 1 mm/s or so with the pressurizing means (3a, 3b) and the force applied to the pressurizing means starts to be measured from the discharge via the mixer (5), whereby the force at the point when the force becomes maximum can be taken as the load values (Li, Lf).

The apparatus (1) of FIG. 1 is a device for measuring a load value for a two-component curable composition, which has a structure in which two cartridges (2a, 2b) are mounted to load the main agent composition and the curing agent composition, respectively, but only one cartridge is optionally mounted at the time of measuring the load value of the one-component composition.

In addition, the load value Lf can be measured by confirming the maximum force in the same manner 30 minutes after the curing start point. For the two-component composition, for example, main agent and curing agent compositions are injected into two cartridges (2a, 2b), respectively, and pressurized at a constant speed of 1 mm/s with a pressurizing means (3a, 3b), whereby the main agent composition and the curing agent composition are injected into a mixer (5), and then when the amount of the injected compositions has reached 95% of the capacity (volume) of the mixer, the pressurization is stopped, waited for about 30 minutes, and then performed again at the same constant speed (1 mm/s), whereby the maximum force applied to the pressurizing means can be measured as the load value (Lf).

When the force applied to the pressurizing means is monitored in the above manner, usually the force increases from the pressurization start point over time, and then begins to decrease again after a certain period of time, or the increase stops, and a certain level of force tends to be maintained continuously. Therefore, the maximum force may be the force immediately before the start of the decrease in force, or may be the force maintained at the predetermined level.

The types of the cartridge (2), the mixer (5) and the pressurizing means (3) applied in the measuring apparatus (1) are described in the example section.

The curable composition of the present application can be formulated so as to satisfy any one or two or more or all of the required time or confirmation time ($V_{t2}$, $H_{ti}$, $H_{t40}$ and $H_{t90}$) and/or their differences ($H_{ti}-V_{t2}$, $H_{t40}-H_{ti}$ and $H_{t90}-H_{t40}$d) as described above according to the application.

The times $V_{t2}$, $H_{t40}$ and $H_{t90}$ and their differences $H_{ti}-V_{t2}$, $H_{t40}-H_{ti}$ and $H_{t90}-H_{t40}$ can be adjusted by controlling, for example, the amounts of the reaction inhibitor and/or catalyst, the functional group of the reaction inhibitor, and the like.

The polyol contained in the curable composition may be a main agent resin. When the curable composition is a urethane composition, the polyol (main agent resin) may react with a curing agent to form a polyurethane. In this case, an isocyanate compound may be used as the curing agent. The polyurethane may comprise both the polyol-derived unit and the isocyanate-derived unit. The polyol-derived unit may be a unit formed by urethane-reacting the polyol with the isocyanate compound, and the isocyanate compound-derived unit may be a unit formed by urethane-reacting the isocyanate compound with the polyol.

The ratio of the polyol in the curable composition may be adjusted within a range of about 0.5 to 40 parts by weight relative to 100 parts by weight of the filler. When the curable composition is a main agent composition of a two-component curable composition, the ratio is a ratio of the weight of the polyol to the weight of all fillers included in the main agent composition, and when it is a mixture of the main agent and curing agent compositions of the two-component curable composition, the ratio is a ratio of the weight of the polyol to the weight of all fillers included the mixture. In another example, the ratio may be further adjusted in a range of about 1 part by weight or more, 1.5 parts by weight or more, 2 parts by weight or more, 2.5 parts by weight or more, 3 parts by weight or more, 3.5 parts by weight or more, 4 parts by weight or more, 4.5 parts by weight or more, 5 parts by weight or more, 5.5 parts by weight or more, 6 parts by weight or more, 6.5 parts by weight or more, 7 parts by weight or more, 7.5 parts by weight or more, 8 parts by weight or more, 8.5 parts by weight or more, or 9 parts by weight or more and/or in a range of 38 parts by weight or less, 36 parts by weight or less, 34 parts by weight or less, 32 parts by weight or less, 30 parts by weight or less, 28 parts by weight or less, 26 parts by weight or less, 24 parts by weight or less, 22 parts by weight or less, 20 parts by weight or less, 18 parts by weight or less, 16 parts by weight or less, 14 parts by weight or less, 12 parts by weight or less, 10 parts by weight or less, 8 parts by weight or less, or 6 parts by weight or less. Such a ratio is a ratio that may appear in the case of a high filling system in which the content of filler is excessive in the curable composition.

As the polyol, a known polyol can be applied without any particular limitation. For example, as the polyol, a polyol applied to the formation of polyurethane may be applied. As such a polyol, a so-called polyether polyol, polyester polyol and/or other polyols (polycarbonate polyol, polybutadiene polyol, acrylic polyol, etc.), and the like are known.

In one example, as the polyol, a so-called aliphatic polyol may be used in consideration of the control possibility of an appropriate curing rate.

As the polyol, a polyol having a hydroxyl value (or OH value) in a range of about 50 to 500 may also be used. The unit of the hydroxyl value is mgKOH/g, where the value is a value measured according to the standard test method (ASTM E 1899-08). The hydroxyl value may be further adjusted in a range of about 60 or more, 70 or more, 80 or more, 90 or more, 100 or more, 110 or more, 120 or more, 130 or more, 140 or more, 150 or more, 160 or more, 170 or more, 180 or more, 190 or more, 200 or more, 210 or more, 220 or more, 230 or more, 240 or more, 250 or more, 260 or more, or 270 or more and/or in a range of 490 or less, 480 or less, 470 or less, 460 or less, 450 or less, 440 or less, 430 or less, 420 or less, 410 or less, 400 or less, 390 or less, 380 or less, 370 or less, 360 or less, 350 or less, 340 or less, 330 or less, 320 or less, 310 or less, or 300 or less.

As the polyol, a polyol having a molecular weight in a range of about 100 to 3000 may also be used in consideration of an appropriate curing rate, viscosity, durability and/or adhesion. In this specification, the term molecular weight is a weight average molecular weight (Mw) measured using GPC (gel permeation chromatograph) and the unit is g/mol, unless otherwise specified. In another example, the molecular weight may be further adjusted in a range of 150 or more, 200 or more, 250 or more, 300 or more, or 350 or more and/or in a range of 2500 or less, 2000 or less, 1500 or less, 1000 or less, 900 or less, 800 or less, 700 or less, 600 or less, or 500 or less.

In one example, as the polyol, an ester polyol resin may be used. As the ester polyol, for example, an aliphatic ester polyol satisfying the above-mentioned hydroxyl value and/or molecular weight may be used.

The polyol may be a polyol having non-crystallinity or sufficiently low crystallinity. The term "non-crystallinity" means a case where the crystallization temperature (Tc) and melting temperature (Tm) are not observed in a DSC (differential scanning calorimetry) analysis. The DSC analysis may be performed at a temperature in the range of −80 to 60° C. at a rate of 10° C./min, which may be performed, for example, in a manner that the temperature is raised from 25° C. to 60° C. at the rate, and then reduced again to −80° C., and raised again to 60° C. In addition, here, the sufficiently low crystallinity means a case where the melting point (Tm) observed in the DSC analysis is less than 15° C., thereby being about 10° C. or less, 5° C. or less, 0° C. or less, −5° C. or less, −10° C. or less, or about −20° C. or less or so. At this time, the lower limit of the melting point is not particularly limited, but, for example, the melting point may be about −80° C. or more, −75° C. or more, or about −70° C. or more.

In one example, as the ester polyol, for example, a carboxylic acid polyol or caprolactone polyol may be used.

The carboxylic acid polyol may be formed by reacting a component containing a carboxylic acid and a polyol (e.g., diol or triol, etc.), and the caprolactone polyol may be formed by reacting a component containing caprolactone and a polyol (e.g., diol or triol, etc.). In this case, the carboxylic acid may be a dicarboxylic acid.

In one example, the polyol may be a polyol represented by Formula 2 or 3 below.

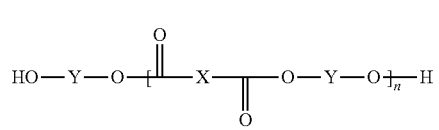

[Formula 2]

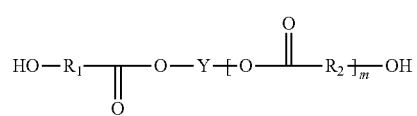

[Formula 3]

In Formulas 2 and 3, X is a carboxylic acid-derived unit, and Y is a polyol-derived unit. The polyol-derived unit may be, for example, a triol unit or a diol unit. In addition, n and m may be any number, for example, n may be a number in the range of 2 to 10, m may be a number in the range of 1 to 10, and $R_1$ and $R_2$ may each independently be an alkylene in the range of 1 to 14 carbon atoms.

The term "carboxylic acid-derived unit" as used herein may mean a portion excluding a carboxyl group in a carboxylic acid compound. Similarly, the term "polyol-derived unit" as used herein may mean a portion excluding a hydroxyl group in a polyol compound structure.

That is, when the hydroxy group of the polyol and the carboxyl group of the carboxylic acid react, a water ($H_2O$) molecule is eliminated by the condensation reaction and simultaneously an ester bond is formed. When the carboxylic acid forms the ester bond by the condensation reaction as such, the carboxylic acid-derived unit may mean a portion, which does not participate in the condensation reaction, in the carboxylic acid structure. In addition, the polyol-derived unit may mean a portion, which does not participate in the condensation reaction, in the polyol structure.

Y in Formula 3 also represents a portion excluding the ester bond after the polyol forms the ester bond with caprolactone. That is, when the polyol and the caprolactone form the ester bond, the polyol-derived unit Y in Formula 3 may mean a portion, which does not participate in the ester bond, in the polyol structure. The ester bonds are represented in Formulas 2 and 3, respectively.

In Formulas above, when the polyol-derived unit of Y is a unit derived from a polyol containing three or more hydroxy groups such as a triol unit, a branched structure may be implemented in the Y portion of the formula structure.

In Formula 2, the type of the carboxylic acid-derived unit of X is not particularly limited, but in order to secure the desired physical properties, the unit may be a unit derived from one or more compounds selected from the group consisting of a fatty acid compound, an aromatic compound having two or more carboxyl groups, an alicyclic compound having two or more carboxyl groups and an aliphatic compound having two or more carboxyl groups.

The aromatic compound having two or more carboxyl groups may be, for example, phthalic acid, isophthalic acid, terephthalic acid, trimellitic acid or tetrachlorophthalic acid.

The alicyclic compound having two or more carboxyl groups may be, for example, tetrahydrophthalic acid or hexahydrophthalic acid.

The aliphatic compound having two or more carboxyl groups may be, for example, oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid or itaconic acid.

Considering the glass transition temperature of the polyol, the aliphatic carboxylic acid-derived unit may be preferable to the aromatic carboxylic acid-derived unit.

The type of the polyol-derived unit of Y in Formulas 2 and 3 is not particularly limited, but in order to secure the desired physical properties, the unit may be derived from one or more compounds selected from the group consisting of an alicyclic compound having two or more hydroxy groups and an aliphatic compound having two or more hydroxy groups.

The alicyclic compound having two or more hydroxy groups may be, for example, 1,3-cyclohexanedimethanol or 1,4-cyclohexanedimethanol.

The aliphatic compound having two or more hydroxy groups may be, for example, ethylene glycol, propylene glycol, 1,2-butylene glycol, 2,3-butylene glycol, 1,3-propanediol, 1,3-butanediol, 1,4-butanediol, 1,6-hexanediol, neopentyl glycol, 1,2-ethylhexyldiol, 1,5-pentanediol, 1,9-nonandiol, 1,10-decanediol, glycerin or trimethylolpropane.

In Formula 2, n is an arbitrary number, and the range may be selected in consideration of the desired physical properties of the curable composition or the resin layer, which is a cured product thereof. For example, n may be about 2 to 10 or 2 to 5.

In Formula 3, m is an arbitrary number, and the range may be selected in consideration of the desired physical properties of the curable composition or the resin layer, which is a cured product thereof. For example, m may be about 1 to 10 or 1 to 5.

When n and m in Formulas 2 and 3 are outside the above range, the polyol may exhibit crystallinity highly, and simultaneously adversely affect the injection processability of the composition.

In Formula 3, $R_1$ and $R_2$ are each independently an alkylene in the range of 1 to 14 carbon atoms. The number of carbon atoms may be selected in consideration of the desired physical properties of the curable composition or the resin layer, which is a cured product thereof.

As the reaction inhibitor contained in the curable composition, a compound having a reaction-inhibitory functional group may be used. The term reaction-inhibitory functional group means a functional group capable of delaying or inhibiting the reaction of the main agent resin and the curing agent, which may mean, for example, a functional group exhibiting higher reactivity to the curing agent than the main agent resin, or exhibiting higher reactivity to the main agent resin than the curing agent. The type of such a reaction-inhibitory functional group is determined according to the type of the main agent resin and/or the curing agent. For example, when the main agent resin is a polyol and the curing agent is an isocyanate compound, the reaction-inhibitory functional group may be a mercapto group, an amino group and/or a phenolic hydroxyl group. Such a functional group exhibits higher reactivity with respect to the isocyanate compound than the polyol, whereby the desired waiting time can be secured.

In one example, as the reaction inhibitor, a compound having a reaction-inhibitory functional value by the following equation 2 in a range of 0.001 to 0.02 may be used.

$$FV = F/M \qquad \text{[Equation 2]}$$

In Equation 2, FV is the reaction-inhibitory functional value, F is the number (molar number) of reaction-inhibitory functional groups present in the reaction inhibitor, and M is the molar mass of the reaction inhibitor.

Through the use of the reaction inhibitor having the reaction-inhibiting functional value, a suitable waiting time and a desired curing rate after the waiting time can be efficiently achieved.

In another example, the functional value may be further adjusted in the range of 0.002 or more, 0.003 or more, 0.004 or more, or 0.0045 or more and/or in the range of 0.015 or less, 0.01 or less, 0.009 or less, 0.008 or less, 0.007 or less, 0.006 or less, or 0.0055 or less.

In one example, M in Equation 2 may be in a range of about 50 to 400 g/mol. In another example, M may be further adjusted in the range of about 60 g/mol or more, 70 g/mol or more, 80 g/mol or more, 90 g/mol or more, 100 g/mol or more, 110 g/mol or more, 120 g/mol or more, 130 g/mol or more, 140 g/mol or more, 150 g/mol or more, 160 g/mol or more, 170 g/mol or more, 180 g/mol or more, 190 g/mol or more, or 195 g/mol or more and/or in the range of 390 g/mol or less, 380 g/mol or less, 370 g/mol or less, 360 g/mol or less, 350 g/mol or less, 340 g/mol or less, 330 g/mol or less, 320 g/mol or less, 310 g/mol or less, 300 g/mol or less, 290 g/mol or less, 280 g/mol or less, 270 g/mol or less, 260 g/mol or less, 250 g/mol or less, 240 g/mol or less, 230 g/mol or less, 220 g/mol or less, 210 g/mol or less, 200 g/mol or less, 190 g/mol or less, 180 g/mol or less, 170 g/mol or less, 160 g/mol or less, 150 g/mol or less, 140 g/mol or less, 130 g/mol or less, 120 g/mol or less, or 110 g/mol or less.

As a suitable reaction inhibitor, a compound having a mercapto group among the functional groups may be used, and for example, a compound represented by the following formula 1 may be used. In particular, a compound having the functional value and/or molar mass may be used among the compounds of the following formula 1.

$$R_1\text{-}R_2\text{-}SH \qquad \text{[Formula 1]}$$

In Formula 1, $R_1$ may represent an alkyl group, an alkoxy group, an aromatic hydrocarbon group or $-\text{Si}(R_3)_3$. Here, $R_3$ may each independently be an alkyl group or an alkoxy group. In Formula 1, $R_2$ may be a single bond or an alkylene group.

In Formula 1, the alkyl group, alkoxy group or alkylene group may be an alkyl group, alkoxy group or alkylene group having 1 to 20 carbon atoms, 1 to 16 carbon atoms, 1 to 12 carbon atoms, 1 to 8 carbon atoms or 1 to 4 carbon atoms. The alkyl group, alkoxy group or alkylene group may be linear, branched or cyclic.

In Formula 1, the aromatic hydrocarbon group means an aryl group or a heteroaryl group. In one embodiment, the aryl group may be a phenyl group, a biphenyl group, a naphthyl group, an anthracenyl group, a phenanthryl group, a pyrenyl group, a phenylenyl group, a chrysenyl group or a fluorenyl group, but is not limited thereto. In addition, the heteroaryl group is a thiophene group, a furan group, a pyrrole group, an imidazole group, a thiazole group, an oxazole group, an oxadiazole group, a triazole group, a pyridyl group, a bipyridyl group, a pyrimidyl group, a triazine group, an acridyl group, a pyridazine group, a pyrazinyl group, a quinolinyl group, a quinazoline group, a quinoxalinyl group, a phthalazinyl group, a pyridopyrimidine group, a pyridopyrazinyl group, a pyrazinopyrazinyl group, an isoquinoline group, an indole group, a carbazole group, a benzoxazole group, a benzimidazole group, a benzothiazole group, a benzocarbazole group, a benzothiophene group, a dibenzothiophene group, a benzofuranyl group, a phenanthroline group, a thiazolyl group, an isoxazolyl group, an oxadiazolyl group, a thiadiazolyl group or a dibenzofuranyl group, and the like, but is not limited thereto.

In Formula 1, the single bond means a case where the atomic groups on both sides are directly bonded without mediating separate atoms.

The alkyl group, alkoxy group, alkylene group or aromatic hydrocarbon group of Formula 1 may be optionally substituted with one or more substituents. At this time, the substituent may be exemplified by an alkyl group, an alkoxy group, an aromatic hydrocarbon group or a mercapto group, and the like, but is not limited thereto.

As another example, in Formula 1, $R_1$ represents an alkyl group having 1 to 4 carbon atoms unsubstituted or substituted with an alkyl group having 1 to 4 carbon atoms or an alkoxy group having 1 to 4 carbon atoms; an aromatic hydrocarbon group unsubstituted or substituted with an alkyl group having 1 to 4 carbon atoms or an alkoxy group having 1 to 4 carbon atoms; or —Si($R_3$)$_3$, where $R_3$ may each independently be an alkoxy group having 1 to 4 carbon atoms. Meanwhile, in Formula 1, $R_2$ may be a single bond; or may be an alkylene group having 1 to 10 carbon atoms, or an alkylene group having 2 to 10 carbon atoms.

In one example, the compound represented by Formula 1 may have only one mercapto group as the reaction-inhibitory functional group. Accordingly, in Formula 1, $R_1$ and $R_2$ may not include a mercapto group (—SH) and other reaction-inhibitory functional groups.

The content of the reaction inhibitor in the curable composition may be controlled within a range suitable for securing a desired curing rate or the like. In one example, the reaction inhibitor may be present in a range of about 0.05 to 0.5 parts by weight in total 100 parts by weight of the curable composition. When the curable composition comprises components to be finally removed such as a solvent, the total 100 parts by weight of the curable composition is the range defined by excluding the weight of the component to be removed. In addition, when the curable composition is the one-component type, the total 100 parts by weight is the range defined based on the weight of the composition, and when it is the two-component type, it is the range obtained based on the weight of the main agent composition, the weight of the curing agent composition, or the total weight of the main agent and curing agent compositions.

In another example, the ratio of the reaction inhibitor may be further adjusted in the range of about 0.06 parts by weight or more, 0.07 parts by weight or more, 0.08 parts by weight or more, 0.09 parts by weight or more, or about 0.1 parts by weight or more and/or in the range of about 0.45 parts by weight or less, 0.40 parts by weight or less, 0.35 parts by weight or less, or about 0.30 parts by weight or less.

In another example, the reaction inhibitor may also be adjusted in the curable composition so that the weight ratio (IW/CW) of the content of the reaction inhibitor (IW) to the content of the catalyst (CW) is in the range of 1.3 to 4. In such a range, the desired waiting time and the curing rate after the waiting time may be more effectively secured.

The contents IW and CW have the same unit mutually, which may be absolute weights of the catalyst and the reaction inhibitor contained in the curable composition, or may be parts by weight relative to 100 parts by weight of the polyol. As another example, the ratio (IW/CW) may be further adjusted in the range of about 1.35 or more, 1.4 or more, 1.45 or more, 1.50 or more, about 1.55 or more, 2 or more, 2.5 or more, or 3 or more and/or in the range of about 3.8 or less, about 3.6 or less, about 3.4 or less, about 3.2 or less, about 3 or less, about 2.98 or less, 2.96 or less, about 2.94 or less, about 2.5 or less, or about 2 or less.

By adjusting the ratio (IW/CW), it is possible to control the waiting time and/or the curing rate after the waiting time.

In another example, the content of the reaction inhibitor in the curable composition may be adjusted in a range in which $R_1$ of the following equation 3 is in the range of 2 to 30.

$$R1 = (W1 \times O/M) - (FV \times W2) \quad \text{[Equation 3]}$$

In Equation 3, O is the hydroxyl value of the polyol, M is the weight average molecular weight of the polyol, FV is the reaction-inhibitory functional value (FV obtained by Equation 2), W1 is the weight ratio of the polyol to the reaction inhibitor, and W2 is the weight ratio of the reaction inhibitor to the polyol. For example, according to Equation 3 above, the weight ratio (polyol:reaction inhibitor) of the polyol and the reaction inhibitor in the curable composition is W1:W2.

When two or more polyols and/or two or more reaction inhibitors in the curable composition are present, the W1×O/M and FV×W2 calculated for each are summed to confirm Equation 3 above. For example, when a first polyol having a hydroxyl value of O1 and a weight average molecular weight of M1 and a second polyol having a hydroxyl value of O2 and a weight average molecular weight of M2, and a first reaction inhibitor having a reaction-inhibitory functional value of FV1 and a second reaction inhibitor having a reaction-inhibitory functional value of FV2 are present in the curable composition in the weight ratio of $W_{11}:W_{12}:W_{21}:W_{22}$ (first polyol:second polyol:first reaction inhibitor:second reaction inhibitor), the $W_{11} \times O1/M1 + W_{12} \times O2/M2$ becomes W1×O/M in Equation 3 above, and the $FV1 \times W_{21} + FV2 \times W_{22}$ becomes FV×W2 in Equation 3 above.

In another example, R1 may also further be adjusted in the range of 2.5 or more, 3 or more, 3.5 or more, 4 or more, 4.5 or more, 5 or more, 5.5 or more, 6 or more, or 6.5 or more and/or in the range of 29 or less, 28 or less, 27 or less, 26 or less, 25 or less, 24 or less, 23 or less, 22 or less, 21 or less, 20 or less, 19 or less, 18 or less, 17 or less, 16 or less, 15 or less, 14 or less, 13 or less, 12 or less, 11 or less, 10 or less, 9 or less, 8 or less, or 7 or less.

Within the range of R1, a desired waiting time can be secured, and a desired curing rate can be efficiently secured after the waiting time.

The type of catalyst included in the curable composition is also not particularly limited, where a known catalyst for the reaction of the polyol and the curing agent may be used. As such a catalyst, for example, a urethane catalyst, various types are known. An example thereof includes a tertiary amine compound, an aprotic salt or an organometallic compound, where in a suitable example, an organic tin-based catalyst such as dibutyltin dilaurate (DBTDL) may be used, without being limited thereto.

The content of the catalyst in the curable composition may be controlled within a range suitable for securing a desired curing rate or the like. In one example, the catalyst may be present in a range of about 0.01 to 0.1 parts by weight in total 100 parts by weight of the curable composition. When the curable composition comprises components to be finally removed such as a solvent, the total 100 parts by weight of the curable composition is the range defined by excluding the weight of the component to be removed. In addition, when the curable composition is the one-component type, the total 100 parts by weight is the range defined based on the weight of the composition, and when it is the two-component type, it is the range obtained based on the weight of the main agent composition, the weight of the curing agent composition, or the total weight of the main agent and curing agent compositions. In another example, the ratio of the catalyst may be further adjusted in the range of about 0.02 parts by weight or more, 0.03 parts by weight or more, or about 0.04 parts by weight or more and/or in the range of about 0.09 parts by weight or less, 0.08 parts by weight or less, or about 0.07 parts by weight or less.

In order to obtain an appropriate effect, the content of the catalyst may be further adjusted within the range that can satisfy the above ratio (IW/CW).

The curable composition may comprise a filler in order to secure a desired function (e.g., thermal conductivity, etc.). In particular, according to the present application, a desired waiting time and/or curing rate after the waiting time can be effectively achieved even under a high filling system in which the filler is included in a very excessive amount. When the curable composition is a two-component type, the filler may also be included in each of the main agent and curing agent compositions of the two-component composition.

In one example, the filler may be a thermally conductive filler. The term thermally conductive filler may mean a filler made of a material having a thermal conductivity of about 1 W/mK or more, 5 W/mK or more, 10 W/mK or more, or about 15 W/mK or more. The thermal conductivity of the thermally conductive filler may be about 400 W/mK or less, 350 W/mK or less, or about 300 W/mK or less. The type of the thermally conductive filler is not particularly limited, but may be an inorganic filler when insulation properties are considered together. For example, ceramic particles such as alumina ($Al_2O_3$), aluminum nitride, boron nitride, silicon nitride, SiC or BeO may be used.

The shape or ratio of the filler is not particularly limited, which may be appropriately adjusted in consideration of the viscosity and hardness of the curable composition, the curing rate of the curable composition, the sedimentation possibility in the resin layer that the curable composition is cured, the desired thermal resistance or thermal conductivity, insulation properties, hardness, filling effect, dispersibility or storage stability, and the like. In general, as the size of the filler increases, the viscosity of the composition comprising the same increases, and the sedimentation possibility of the filler in the resin layer to be described below increases. In addition, as the size decreases, the thermal resistance tends to increase. Accordingly, in consideration of such aspects, a filler of an appropriate type and size may be selected, and if necessary, two or more fillers may also be used together. Furthermore, it is advantageous to use a spherical filler in consideration of the amount to be filled, but a filler in the form of a needle or plate may also be used in consideration of the formation of a network or the conductivity, and the like.

In one example, the filler may have an average particle diameter in a range of about 0.001 μm to 80 μm. In another example, the average particle diameter of the filler may be about 0.01 μm or more, 0.1 μm or more, 0.5 μm or more, 1 μm or more, 2 μm or more, 3 μm or more, 4 μm or more, 5 μm or more, or about 6 μm or more. In another example, the average particle diameter of the filler may be about 75 μm or less, 70 μm or less, 65 μm or less, 60 μm or less, 55 μm or less, 50 μm or less, 45 μm or less, 40 μm or less, 35 μm or less, 30 μm or less, 25 μm or less, 20 μm or less, 15 μm or less, 10 μm or less, or about 5 μm or less. The term average particle diameter of filler is a particle diameter also referred to as a so-called D50 particle diameter or median diameter. The D50 particle diameter is a particle diameter (median diameter) at 50% accumulation based on the volume, and means a particle diameter at the point where the accumulated value becomes 50% in the cumulative curve with the total volume as 100%, which may be measured by a known laser diffraction method. The D50 particle diameter mentioned in this specification may be a particle diameter measured according to ISO-13320 by using Marvern's MASTERSIZER3000 equipment and using ethanol as a solvent.

The curable composition may be a high filling system comprising an excess of the filler. For example, in the curable composition, the filler may be present in a ratio within the range of 70 to 95 parts by weight in 100 parts by weight of the curable composition (i.e., in one example, the ratio of the filler in the curable composition may be 70 to 95 wt % or so). When the curable composition comprises components to be finally removed such as a solvent, the total 100 parts by weight of the curable composition is the range defined by excluding the weight of the component to be removed. In addition, when the curable composition is the one-component type, the total 100 parts by weight is the range defined based on the weight of the composition, and when it is the two-component type, it is the range obtained based on the weight of the main agent composition, the weight of the curing agent composition, or the total weight of the main agent and curing agent compositions. In another example, the content of the filler may be further adjusted in the range of about 74 parts by weight or more, 78 parts by weight or more, 82 parts by weight or more, or about 86 parts by weight or more and/or in the range of 94 parts by weight or less, 93 parts by weight or less, or about 92 parts by weight or less.

In one example, the content of the filler in the curable composition may be in the range of 70 to 95 wt %, which may also further be adjusted in the range of about 72 wt % or more, 74 wt % or more, 76 wt % or more, 78 wt % or more, 80 wt % or more, 82 wt % or more, 84 wt % or more, 86 wt % or more, or 88 wt % or more and/or in the range of 93 wt % or less, or 91 wt % or less.

Within such a filler content range, the desired function of the filler can be expressed. For example, when the filler is a thermally conductive filler, a cured product may be formed, which satisfies high thermal conductivity (e.g., 3.0 W/mK or more) in the content range.

In addition to the above-mentioned types, various types of fillers may be used in the curable composition. For example, when the insulation properties of the resin layer that the curable composition is cured are secured, the use of a carbon filler such as graphite may also be considered. Alternatively, for example, a filler such as fumed silica, clay, calcium carbonate, zinc oxide (ZnO) or aluminum hydroxide (Al $(OH)_3$) may also be used. The shape or content ratio of such a filler is not particularly limited, which may be selected in consideration of the viscosity of the curable composition, curing rate, sedimentation possibility in the resin layer, thixotropy, insulation properties, filling effect and/or dispersibility, and the like.

The curable composition may further comprise a curing agent if necessary. In the two-component composition, the curing agent may be included in the curable composition in a state where it is physically separated from the polyol, which is the main agent resin. For example, when the curable composition is a two-component composition, the curable composition may comprise the polyol, the reaction inhibitor, the catalyst and the filler in the main agent composition, and may comprise the curing agent in the curing agent composition. The curing agent composition may also comprise the filler together with the curing agent.

As the curing agent, a known curing agent may be used without particular limitation, and for example, an isocyanate compound commonly used as a curing agent for a polyol in a urethane composition may be used. The type of isocyanate compound that can be applied as the curing agent is not particularly limited, but a non-aromatic isocyanate compound without any aromatic group may be used to secure desired physical properties. In the case of using an aromatic polyisocyanate, the reaction rate may be too fast and the glass transition temperature of the cured product may be increased, so that it may be disadvantageous in securing the above-described waiting time and/or curing rate after the waiting time and it may be difficult that the resin layer to be described below, which is a cured product of the curable composition, satisfies physical properties such as electrical insulation properties and adhesion force.

As the non-aromatic isocyanate compound, for example, an aliphatic polyisocyanate such as hexamethylene diisocyanate, trimethylhexamethylene diisocyanate, lysine diisocyanate, norbornane diisocyanate methyl, ethylene diisocyanate, propylene diisocyanate or tetramethylene diisocyanate; an alicyclic polyisocyanate such as transcyclohexane-1,4-diisocyanate, isophorone diisocyanate, bis(isocyanate methyl)cyclohexane diisocyanate or dicyclohexylmethane diisocyanate; or any one or more carbodiimide-modified polyisocyanates or isocyanurate-modified polyisocyanates; and the like may be used. In addition, a mixture of two or more of the compounds listed above may be used.

In one example, as the isocyanate compound, a compound having an isocyanate value of 0.001 to 0.1 according to the following formula 4 may be used.

Such a compound is effective in securing the above-described waiting time and/or curing rate after the waiting time.

$$NCOV = NCO/MN \qquad \text{[Equation 4[}$$

In Equation 4, NCOV is the isocyanate value, NCO is the number (molar number) of isocyanate groups in the isocyanate compound, and MN is the molar mass of the isocyanate compound.

In another example, the isocyanate value may also further be adjusted in the range of 0.003 or more, 0.005 or more, 0.007 or more, 0.009 or more, or 0.01 or more and/or in the range of 0.09 or less, 0.08 or less, 0.07 or less, 0.06 or less, 0.05 or less, 0.04 or less, 0.03 or less, 0.02 or less, or 0.015 or less.

In Equation 4, the molar mass (MN) of the isocyanate compound may be, for example, in a range of 60 to 300 g/mol. In another example, the molar mass (MN) may also further be adjusted in the range of 70 g/mol or more, 80 g/mol or more, 90 g/mol or more, 100 g/mol or more, 110 g/mol or more, 120 g/mol or more, 130 g/mol or more, 140 g/mol or more, 150 g/mol or more, or 160 g/mol or more and/or in the range of 290 g/mol or less, 280 g/mol or less, 270 g/mol or less, 260 g/mol or less, 250 g/mol or less, 240 g/mol or less, 230 g/mol or less, 220 g/mol or less, 210 g/mol or less, 200 g/mol or less, 190 g/mol or less, 180 g/mol or less, or 170 g/mol or less.

The resin component included in the curable composition (e.g., the polyol, the isocyanate compound and/or a reactant therebetween) may have a glass transition temperature (Tg) of less than 0° C. after curing. When the glass transition temperature range is satisfied, brittle characteristics can be secured within a relatively short time even at a low temperature in which the battery module or battery pack can be used, thereby ensuring impact resistance and vibration resistance characteristics. In one example, the lower limit of the glass transition temperature of the curable composition after curing may be about −70° C. or more, −60° C. or more, −50° C. or more, −40° C. or more, or about −30° C. or more, and the upper limit thereof may be about −5° C. or less, −10° C. or less, −15° C. or less, or about −20° C. or less.

The ratio of the polyol and the isocyanate compound in the curable composition is not particularly limited, which may be appropriately adjusted to enable a urethane reaction therebetween. For example, the ratio of the polyol and the isocyanate compound may be a ratio of 1.0:1.1 to 1.0:2.0 (polyol:isocyanate compound) in an equivalent ratio.

In another example, the isocyanate compound may also be present in a curable composition in which R2 of Equation 5 below is in the range of 10 to 150.

$$R2 = (W1 \times O/M)/(NCOV \times W3) \qquad \text{[Equation 5]}$$

In Equation 5, O is the hydroxyl value of the polyol, and NCOV is the isocyanate value of the isocyanate compound. In Equation 5, W1 is the weight ratio of the polyol to the isocyanate compound, and W3 is the weight ratio of the isocyanate compound to the polyol. That is, the weight ratio (polyol:isocyanate compound) of the polyol and the isocyanate compound in the curable composition is W1:W3.

When two or more polyols and/or two or more isocyanate compounds in the curable composition are present, the W1×O/M and NCOV×W3 calculated for each are summed to confirm Equation 5 above. For example, when a first polyol having a hydroxyl value of 01 and a weight average molecular weight of M1 and a second polyol having a hydroxyl value of 02 and a weight average molecular weight of M2, and a first isocyanate compound having an isocyanate value (NCO value) of NCOV1 and a second isocyanate compound having an isocyanate value of NCOV2 are present in the curable composition in the weight ratio of $W_{11}$: $W_{12}$:$W_{31}$:$W_{32}$ (first polyol:second polyol:first isocyanate compound:second isocyanate compound), the $W_{11} \times O1/M1 + W_{12} \times O2/M2$ becomes W1×O/M in Equation 5 above, and the NCOV1×$W_{31}$+NCOV2×$W_{32}$ becomes NCOV×W3 in Equation 5 above.

In another example, the R2 may also further be adjusted in the range of 15 or more, 20 or more, 25 or more, 30 or more, 35 or more, 40 or more, 45 or more, 50 or more, 55 or more, 60 or more, or 65 or more and/or in the range of 140 or less, 130 or less, 120 or less, 110 or less, 100 or less, 95 or less, 90 or less, 85 or less, 80 or less, 75 or less, 70 or less, 65 or less, or 60 or less.

In another example, the isocyanate compound may also be present in a curable composition in which R3 of Equation 6 below is in the range of 50 to 500.

$$R3 = (FV \times W2)/(NCOV \times W3) \qquad \text{[Equation 6]}$$

In Equation 6, FV is the reaction-inhibitory functional value of the reaction inhibitor, and NCOV is the isocyanate value of the isocyanate compound. In Equation 6, W2 is the weight ratio of the reaction inhibitor to the isocyanate compound, and W3 is the weight ratio of the isocyanate compound to the reaction inhibitor. That is, the weight ratio (reaction inhibitor:isocyanate compound) of the reaction inhibitor and the isocyanate compound in the curable composition is W2:W3.

When two or more reaction inhibitors and/or two or more isocyanate compounds in the curable composition are present, the FV×W2 and NCOV×W3 calculated for each are summed to confirm Equation 6 above. For example, when a first reaction inhibitor having a reaction-inhibitory functional value of FV1 and a second reaction inhibitor having a reaction-inhibitory functional value of FV2, and a first isocyanate compound having an isocyanate value (NCO value) of NCOV1 and a second isocyanate compound having an isocyanate value of NCOV2 are present in the curable composition in a weight ratio of $W_{21}:W_{22}:W_{31}:W_{32}$ (first reaction inhibitor:second reaction inhibitor:first isocyanate compound:second isocyanate compound), the $W_{21} \times FV1 + W_{22} \times FV2$ becomes FV×W2 in Equation 6 above, and the $NCOV1 \times W_{31} + NCOV2 \times W_{32}$ becomes NCOV×W3 in Equation 6 above.

In another example, R3 may also further be adjusted in the range of 55 or more, 60 or more, 65 or more, 70 or more, 75 or more, 80 or more, 85 or more, 90 or more, 95 or more, 100 or more, 110 or more, 120 or more, 130 or more, 140 or more, 150 or more, 160 or more, 170 or more, 180 or more, 190 or more, or 200 or more and/or in the range of 490 or less, 480 or less, 470 or less, 460 or less, 450 or less, 440 or less, 430 or less, 420 or less, 410 or less, 400 or less, 390 or less, 380 or less, 370 or less, 360 or less, 350 or less, 340 or less, 330 or less, 320 or less, 310 or less, 300 or less, 290 or less, 280 or less, 270 or less, 260 or less, 250 or less, 240 or less, 230 or less, 220 or less, 210 or less, 200 or less, 190 or less, 180 or less, 170 or less, 160 or less, 150 or less, 140 or less, 130 or less, 120 or less, 110 or less, or 100 or less.

Within the range of R2 and/or R3, a desired waiting time can be secured and a desired curing rate can be efficiently secured after the waiting time.

By controlling the ratio of the isocyanate compound in accordance with the foregoing, it is advantageous to satisfy the desired curing properties (the waiting time and/or the curing rate after the waiting time).

In addition to the above components, the curable composition may also further comprise necessary appropriate components.

For example, the curable composition may further comprise a viscosity modifier, such as a thixotropy imparting agent, a diluent, a dispersant, a surface treatment agent or a coupling agent, and the like, in order to adjust the required viscosity, for example, to increase or decrease the viscosity, or to adjust the viscosity according to shear force.

The thixotropy imparting agent may adjust the viscosity according to the shear force of the curable composition to effectively perform the manufacturing process of the battery module. The usable thixotropy imparting agent may be exemplified by fumed silica and the like.

The diluent or dispersant is generally used to lower the viscosity of the curable composition, and any of various types known in the art may be used without limitation as long as it can exhibit the above-described action.

The surface treatment agent is for surface treatment of the filler introduced into the resin layer, and any of various types known in the art may be used without limitation as long as it can exhibit the above-described action.

The coupling agent may be used, for example, to improve the dispersibility of a thermally conductive filler such as alumina, and any of various types known in the art may be used without limitation as long as it can exhibit the above-described action.

In addition, the curable composition may further comprise a flame retardant or a flame-retardant adjuvant, and the like. In this case, a known flame retardant may be used without particular limitation, and for example, a solid flame retardant in the form of the filler or a liquid flame retardant, and the like may be applied. The flame retardant includes, for example, an organic flame retardant such as melamine cyanurate or an inorganic flame retardant such as magnesium hydroxide, and the like. When the amount of filler to be filled in the resin layer is large, a liquid-type flame-retardant material (TEP, triethyl phosphate or TCPP, tris(1, 3-chloro-2-propyl)phosphate, etc.) may also be used. Furthermore, a silane coupling agent capable of acting as a flame-retardant synergist may also be added.

The curable composition may comprise the constitutions as described above, and may also be a solvent-type composition, an aqueous composition or a solventless composition, but it may be appropriately a solventless type, considering the convenience of the manufacturing process.

The curable composition may also exhibit the desired suitable physical properties by comprising the above components as described above.

The present application may also relate to a battery module. The battery module may comprise a module case having an internal space and a plurality of battery cells present in the internal space. The battery cell may be accommodated in the module case. One or more battery cells may exist in the module case, and the plurality of battery cells may be accommodated in the module case. The number of battery cells accommodated in the module case is not particularly limited as it is adjusted according to the use or the like. The battery cells accommodated in the module case may be electrically connected to each other.

The battery module may comprise a resin layer, which is a cured product of the curable composition. The resin layer may exist in the internal space of the module case in contact with the plurality of battery cells and also in contact with the module case.

For example, the battery module may be produced through a step of injecting the above-described curable composition into a battery module and a step of inspecting the battery module into which the curable composition is injected. In the above process, the battery cell may be mounted into the battery module case before the curable composition is injected into the battery module, or may be mounted into the battery module case after the curable composition is injected into the battery module.

The module case may comprise at least sidewalls and a bottom plate forming an internal space where the battery cells may be accommodated. In addition, the module case may further comprise an top plate sealing the internal space. The sidewalls, the bottom plate and the top plate may be integrally formed with one another, or the module case may be formed by assembling the sidewalls, the bottom plate and/or the top plate, each of which is separated. The shape and size of such a module case are not particularly limited, which may be appropriately selected according to the use or the shape and number of battery cells accommodated in the internal space, and the like.

Here, since there are at least two plates constituting the module case, the term top plate and bottom plate are terms having relative concepts used to distinguish them. That is, it does not mean that in the actual use state, the top plate necessarily exists at the upper portion and the bottom plate necessarily exists at the lower portion.

FIG. 2 is a view showing an exemplary module case (10), which is an example of a box-shaped case (10) comprising one bottom plate (10a) and four sidewalls (10b). The module case (10) may further comprise a top plate (10c) sealing the internal space.

FIG. 3 is a schematic view of the module case (10) of FIG. 2, as observed from above, in which the battery cells (20) are housed.

A hole may be formed in the bottom plate, the sidewalls, and/or the top plate of the module case. When a resin layer is formed by an injection process, the hole may be an injection hole used for injecting a material for forming the resin layer, that is, the above-described curable composition. The shape, number and position of the hole can be adjusted in consideration of the injection efficiency of the material for forming the resin layer. In one example, the hole may be formed at least on the bottom plate and/or the top plate.

An observation hole may be formed at the end of the top plate and the bottom plate, and the like where the injection hole is formed. For example, when the material of the resin layer is injected through the injection hole, such an observation hole may be formed for observing whether the injected material is injected well to the end of the sidewalls, the bottom plate, or the top plate. The position, shape, size, and number of the observation hole are not particularly limited as long as they are formed so that it can be confirmed whether the injected material is properly injected.

The module case may be a thermally conductive case. The term thermally conductive case means a case in which the thermal conductivity of the entire case is 10 W/mk or more, or at least a portion having the thermal conductivity as above is included. For example, at least one of the sidewalls, the bottom plate and the top plate as described above may have the thermal conductivity described above. In another example, at least one of the sidewalls, the bottom plate, and the top plate may comprise a portion having the thermal conductivity.

Here, in another example, the thermal conductivity of the thermally conductive top plate, bottom plate, sidewall or the thermally conductive portion may be about 20 W/mk or more, 30 W/mk or more, 40 W/mk or more, 50 W/mk or more, 60 W/mk or more, 70 W/mk or more, 80 W/mk or more, 90 W/mk or more, 100 W/mk or more, 110 W/mk or more, 120 W/mk or more, 130 W/mk or more, 140 W/mk or more, 150 W/mk or more, 160 W/mk or more, 170 W/mk or more, 180 W/mk or more, 190 W/mk or more, or about 195 W/mk or more. The higher the value of the thermal conductivity is, the more advantageous it is from the viewpoint of the heat dissipation property of the module, and the like, and the upper limit is not particularly limited. In one example, the thermal conductivity may be about 1,000 W/mk or less, 900 W/mk or less, 800 W/mk or less, 700 W/mk or less, 600 W/mk or less, 500 W/mk or less, 400 W/mk or less, 300 W/mk or less, or about 250 W/mk or less, but is not limited thereto. The kind of materials exhibiting the thermal conductivity as above is not particularly limited, and for example, includes metal materials such as aluminum, gold, silver, tungsten, copper, nickel, or platinum. The module case may be comprised entirely of the thermally conductive material as above, or at least a part of the module case may be a portion comprised of the thermally conductive material. Accordingly, the module case may have the above-mentioned range of thermal conductivity, or comprise at least one portion having the aforementioned thermal conductivity.

In the module case, the portion having a thermal conductivity in the above range may be a portion in contact with the resin layer and/or the insulating layer. In addition, the portion having the thermal conductivity may be a portion in contact with a cooling medium such as cooling water. When it has such a structure, heat generated from the battery cell can be effectively discharged to the outside.

In the present application, the term battery cell means a unit secondary battery. The type of such a battery cell is not particularly limited, and all of a variety of known battery cells may be applied. In one example, the battery cell may have a pouch type, a cylindrical type or a rectangular type, or other types.

The battery module may comprise a resin layer, which is a cured product of the curable composition, and such a resin layer may exist in the module case, for example, in the form disclosed in Patent Document 1.

The present application also relates to a battery pack, for example, a battery pack comprising two or more battery modules as described above. In the battery pack, the battery modules may be electrically connected to each other. A method of electrically connecting two or more battery modules to constitute a battery pack is not particularly limited, and all known methods can be applied thereto.

The present application also relates to a device comprising the battery module or the battery pack. An example of such a device may include, but is not limited to, automobiles such as electric vehicles, where all applications requiring secondary batteries as power may be included. For example, a method of configuring the automobile using the battery pack is not particularly limited, and a general method can be applied.

Advantageous Effects

The present application may provide a curable composition capable of securing a waiting time after curing start, efficiently controlling the relevant waiting time according to the application, and also controlling a curing rate after the waiting time to suit the application. The present application may provide a curable composition capable of securing the above properties even when it is formulated with a relatively low viscosity or is formulated to comprise an excessive amount of filler.

The present application may also provide a battery module, a battery pack and/or an automobile comprising the curable composition or a cured product thereof.

DESCRIPTION OF DRAWINGS

FIG. 1 shows an exemplary mixer applicable to the present application.

FIG. 2 shows an exemplary module case applicable to the present application.

FIG. 3 schematically shows a form that battery cells are accommodated in a module case.

MODE FOR INVENTION

Hereinafter, the present application is specifically described through Examples and Comparative Examples, but the scope of the present application is not limited by the following Examples.

1. Viscosity

The viscosity of the curable composition (main agent composition, curing agent composition, or mixture thereof) was measured using a Brookfield HB type viscometer. When measuring the viscosity, the temperature was maintained at about 25° C. Using the viscometer, the viscosity of the curable composition was measured over time under conditions of a torque of about 90% and a shear rate of about 100 rpm.

2. Hardness

The hardness of the curable composition was measured using an Asker durometer according to ASTM D 2240 standard. The hardness was measured over time in the thickness direction in a state that the curable composition was maintained in the form of a film having a thickness of about 4 mm and the temperature was maintained at about 25° C. The initial hardness was measured by applying a load of 1 Kg or more (about 1.5 Kg) to the surface of the sample in the form of a film, and the hardness (Shore A hardness) was evaluated by confirming the measured value stabilized after 15 seconds.

3. Load value (Li, Lf)

The load value (kgf) of the curable composition was measured using a measuring apparatus (1) in which two cartridges (2a, 2b) and one static mixer (5) were connected as shown in FIG. 1.

In the measuring apparatus (1), as the cartridges (2a, 2b), cartridges (Sulzer, AB050-01-10-01) having a circular injection part with a diameter of 18 mm and a circular discharge polyol, a reaction inhipart (4, 4a, 4b) with a diameter of 3 mm, and having the height of the cartridges (2a, 2b) of 100 mm and the inner volume of 25 ml was used. In the measuring apparatus (1), as the static mixer (5), a mixer (5) (Sulzer, MBH-06-16T) having a circular discharge part (7) with a diameter of 2 mm, being a stepped type, and having 16 elements was used. In the measuring apparatus, as the pressurization means (3, 3a, 3b), a TA (texture analyzer) was used.

The main agent composition of the two-component curable composition was filled in any one of the two cartridges (2a, 2b), the curing agent composition was filled in the other cartridge, and then a constant force was applied thereto with the pressing means (3, 3a, 3b), whereby the load values (Li, Lf) were measured while the main agent and curing agent compositions were mixed in the static mixer (5) via the first discharge parts (4a, 4b), respectively, and then discharged to the second discharge part (7).

The main agent and curing agent compositions are loaded into the two cartridges (2a, 2b), respectively, and then pressurized at a constant speed of 1 mm/s or so with TAs (texture analyzers) (3a, 3b), whereby the compositions are mixed inside the static mixer (5), and then the force applied to the pressurizing means is measured from the first discharge, where the load value Li is the maximum value at the point where the force becomes the maximum value.

The load value Lf was measured in a manner similar to the load value Li. That is, the main agent and curing agent compositions are loaded into the two cartridges (2a, 2b), respectively, and then pressurized at a constant speed of 1 mm/s or so with TAs (texture analyzers) (3a, 3b), whereby the compositions are mixed inside the static mixer (5), and then the force applied to the pressurizing means is measured from the first discharge, where the load value Lf is the maximum value at the point where the force becomes the maximum value. However, upon measuring Li, the pressurization was performed with the pressurizing means without interruption until the maximum value was measured, but upon measuring Lf, the pressurization by the pressurizing means was stopped at the time when the main agent and curing agent compositions were mixed inside the mixer (5), the curing reaction was performed inside the mixer (5) for 30 minutes or so, and then the maximum value was measured while performing the pressurization again at a constant speed (1 mm/s), where the maximum value was taken as Lf.

The time point when the pressurization was stopped upon the measurement of Lf was a time point when the amount of the main agent composition and the curing agent composition injected into the mixer (5) became 95% or so of the capacity (volume) of the mixer. The mixture was pressurized again at a constant speed of 1 mm/s with the pressurizing means after the 30 minutes, and the force applied to the pressurizing means began to be measured from the first discharge, where the maximum value at the point where the force becomes the maximum value was set as the load value (Lf).

The maximum value is the first confirmed maximum value. That is, when the force applied during pressurization with the pressurizing means is measured as described above, the force increases and then decreases, or increases and then is maintained at a certain level without increasing any more, where the maximum value is the maximum value before the decrease or the maximum value maintained at a certain level.

4. Weight Average Molecular Weight Measurement

The weight average molecular weight of the polyol was measured by GPC (gel permeation chromatograph). Specifically, it was measured according to the following procedure.

(1) Into a 5 mL vial, an analyte (polyol) is put and diluted in THF (tetrahydrofuran) to be a concentration of about 1 mg/mL or so.

(2) A standard sample for calibration and a sample to be analyzed are filtered through a syringe filter (pore size: 0.45 μm).

(3) The GPC analysis is performed after injecting the filtered standard sample and analytical sample into the GPC apparatus.

As the analytical program, ChemStation from Agilent Technologies was used, and the elution time of the sample was compared with the calibration curve to calculate the weight average molecular weight (Mw). The measurement conditions of GPC are as follows.

<GPC Measurement Conditions>

Instrument: 1200 series from Agilent Technologies

Column: using PLgel mixed B from Polymer laboratories

Solvent: THF

Column temperature: 35° C.

Sample concentration: 1 mg/mL, 200 μL injection

Standard samples: Polystyrene (Mp: 3900000, 723000, 316500, 52200, 31400, 7200, 3940, 485)

Example 1

The curable composition was prepared in a two-component type. That is, a polyol (main agent resin), a reaction inhibitor, a catalyst and a filler were mixed to prepare a main agent composition, and an isocyanate compound and a filler were mixed to prepare a curing agent composition.

As the main agent resin, caprolactone polyol represented by the following formula 4 was used. The polyol had a weight average molecular weight of about 400 g/mol or so, and a hydroxyl value (OH value) of about 280 mgKOH/g or so. The hydroxyl value is evaluated according to a standard test method (ASTM E 1899-08).

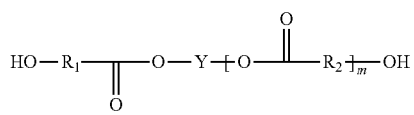

[Formula 3]

In Formula 4, m is a number in a range of 1 to 3, $R_1$ and $R_2$ are each an alkylene having 4 carbon atoms, and Y is a 1,4-butanediol unit.

As the reaction inhibitor, 1-dodecanethiol (molar mass: about 202.4 g/mol) was used, as the catalyst, dibutyltin dilaurate (DBTDL) was used, and as the curing agent, HDI (hexamethylene diisocyanate, molar mass about 168.2 g/mol) was used.

As the filler, alumina was used, where a filler mixture, in which a first filler having a D50 particle diameter of about 40 μm, a second filler having a D50 particle diameter of about 20 μm, and a third filler having a D50 particle diameter of about 2 μm were mixed in a weight ratio of 4:3:3 (first filler:second filler:third filler), was used.

The main agent composition was prepared by mixing the caprolactone polyol, the reaction inhibitor, the catalyst and the filler in a weight ratio of 9.98:0.12:0.040:89.9 (polyol:reaction inhibitor:catalyst:filler), and the curing agent composition was prepared by mixing the HDI and the filler in a weight ratio of 10:90 (HDI:filler). Here, the weight ratio (polyol:HDI) of the polyol in the main agent composition to the HDI in the curing agent composition was 1:1 or so.

The mixing upon the preparation of the main agent composition and the curing agent composition was performed with a planetary mixer.

Example 2

The compositions were each prepared in the same manner as in Example 1, except that the weight ratio (polyol:reaction inhibitor:catalyst:filler) of the caprolactone polyol, the reaction inhibitor, the catalyst and the filler was 9.98:0.15:0.070:89.8 upon preparing the main agent composition, the weight ratio (HDI:filler) of the HDI and the filler was 10:90 upon preparing the curing agent composition, and the weight ratio (polyol:HDI) of the polyol in the main agent composition and the HDI in the curing agent composition was 1:1.

Example 3

The compositions were each prepared in the same manner as in Example 1, except that the weight ratio (polyol:reaction inhibitor:catalyst:filler) of the caprolactone polyol, the reaction inhibitor, the catalyst and the filler was 9.98:0.12:0.070:89.8 upon preparing the main agent composition, the weight ratio (HDI:filler) of the HDI and the filler was 10:90 upon preparing the curing agent composition, and the weight ratio (polyol:HDI) of the polyol in the main agent composition and the HDI in the curing agent composition was 1:1.

Example 4

The compositions were each prepared in the same manner as in Example 1, except that the weight ratio (polyol:reaction inhibitor:catalyst:filler) of the caprolactone polyol, the reaction inhibitor, the catalyst and the filler was 9.97:0.25:0.090:89.7 upon preparing the main agent composition, the weight ratio (HDI:filler) of the HDI and the filler was 10:90 upon preparing the curing agent composition, and the weight ratio (polyol:HDI) of the polyol in the main agent composition and the HDI in the curing agent composition was 1:1.

Example 5

As the reaction inhibitor, 3-mercaptopropyltrimethoxysilane (molar mass: about 196.4 g/mol) was used instead of 1-dodecanethiol (molar mass: about 202.4 g/mol), and other materials were used in the same manner as in Example 1.

The compositions were each prepared in the same manner as in Example 1, except that the weight ratio (polyol:reaction inhibitor:catalyst:filler) of the caprolactone polyol, the reaction inhibitor, the catalyst and the filler was 9.97:0.15:0.070:89.8 upon preparing the main agent composition, the weight ratio (HDI:filler) of the HDI and the filler was 10:90 upon preparing the curing agent composition, and the weight ratio (polyol:HDI) of the polyol in the main agent composition and the HDI in the curing agent composition was 1:1.

Comparative Example 1

The compositions were each prepared in the same manner as in Example 1, except that the weight ratio (polyol:catalyst:filler) of the caprolactone polyol, the catalyst and the filler was 9.99:0.090:89.9 upon preparing the main agent composition, the weight ratio (HDI:filler) of the HDI and the filler was 10:90 upon preparing the curing agent composition, and the weight ratio (polyol:HDI) of the polyol in the main agent composition and the HDI in the curing agent composition was 1:1.

The physical properties measured for Examples and Comparative Examples above were summarized and described in Table 1 below.

TABLE 1

|  | $Vt_2$ | $Ht_i$ | $Ht_{40}$ | $Ht_{90}$ | $L_i$ | $L_f$ |
|---|---|---|---|---|---|---|
| Example 1 | 45.7 | 110 | 115 | 180 | 27.3 | 29.7 |
| Example 2 | 28 | 60 | 65 | 110 | 21.5 | 24.9 |
| Example 3 | 21.5 | 50 | 55 | 90 | 28.8 | 40.4 |
| Example 4 | 45.7 | 85 | 90 | 140 | 27.3 | 29.7 |
| Example 5 | 16.2 | 45 | 50 | 90 | 27.2 | 45.2 |
| Comparative Example 1 | 3.8 | 30 | 40 | 80 | 27.7 | — |

*$Vt_2$: Elapsed time from the time point of mixing the main agent and curing agent compositions until the viscosity of the mixed composition of the main agent and curing agent compositions becomes twice as high as that at the mixing time point (unit: minute)
*$Ht_i$: Required time from the time point of mixing the main agent and curing agent compositions to the start of measurement of Shore A hardness of the mixed composition of the main agent and curing agent compositions (unit: minute)
*$Ht_{40}$: Required time from the time point of mixing the main agent and curing agent compositions to the Shore A hardness of the mixed composition of the main agent and curing agent compositions reaching 40 (unit: minute)
*$Ht_{90}$: Required time from the time point of mixing the main agent and curing agent compositions to the Shore A hardness of the mixed composition of the main agent and curing agent compositions reaching 90 (unit: minute)
*$L_i$: Load value $L_i$ measured for the mixture of the main agent and curing agent compositions (unit: kgf)
*$L_f$: Load value $L_f$ measured for the mixture of the main agent and curing agent compositions (unit: kgf)

It can be confirmed through the results of Table 1 that an appropriate waiting time can be secured by the curable composition of the present application. That is, it has confirmed that the $V_{t2}$ has been measured longer in the presence of the reaction inhibitor than in its absence, and under the same other conditions, the higher the ratio of the amount of reaction inhibitor based on the catalyst amount, the longer the waiting time has been secured, and under the same other conditions, the lower the functional value of the reaction inhibitor, the longer the waiting time has been secured.

In addition, it has been confirmed from $H_{ti}$, $H_{t40}$ or $H_{t90}$ that when other conditions are the same, the case where the content of the catalyst increases, the case where the ratio of the amount of the reaction inhibitor based on the amount of catalyst increases and/or the case where the functional value of the reaction inhibitor increases tend to make the curing rate faster after the waiting time.

Furthermore, the curable compositions of Examples exhibited low load values ($L_i$, $L_f$).

On the other hand, in the case of the curable composition of Comparative Example, the waiting time was not properly secured, and an excessively large load value was exhibited.

The invention claimed is:

1. A curable composition comprising a polyol, a reaction inhibitor, a catalyst and a thermally conductive filler,
wherein the curable composition is a solventless composition,
an amount of the thermally conductive filler is from 70 to 95 weight % based on a total amount of the curable composition, and
the reaction inhibitor comprises one or more reaction-inhibitory functional groups selected from the group consisting of a mercapto group, an amino group and a phenolic hydroxyl group.

2. The curable composition according to claim 1, wherein the polyol has a hydroxyl value in a range of 50 to 500 mgKOH/g.

3. The curable composition according to claim 1, wherein the polyol has a weight average molecular weight in a range of 100 to 3000 g/mol.

4. The curable composition according to claim 1, wherein the reaction inhibitor has a functional value by the following equation 2 in a range of 0.001 to 0.02:

$$FV=F/M \qquad [\text{Equation 2}]$$

wherein, FV is a functional value, F is a number of reaction-inhibitory functional groups in the reaction inhibitor, and M is a molar mass of the reaction inhibitor.

5. The curable composition according to claim 1, wherein the reaction inhibitor is a compound of the following formula 1:

$$R_1\text{-}R_2\text{-}SH \qquad [\text{Formula 1}]$$

wherein, $R_1$ is an alkyl group, an alkoxy group, an aromatic hydrocarbon group or —Si($R_3$)$_3$, where $R_3$ is each independently an alkyl group or an alkoxy group, and $R_2$ is a single bond or an alkylene group.

6. The curable composition according to claim 1, wherein the reaction inhibitor is present such that $R_1$ in the following equation 3 is in a range of 2 to 30:

$$R_1=(W1\times O/M)-(FV\times W2) \qquad [\text{Equation 3}]$$

wherein, O is a hydroxyl value of the polyol, M is a weight average molecular weight of the polyol, FV is a reaction-inhibitory functional value of the reaction inhibitor, W1 is a weight ratio of the polyol to the reaction inhibitor, and W2 is a weight ratio of the reaction inhibitor to the polyol.

7. The curable composition according to claim 1, wherein a weight ratio (IW/CW) of the reaction inhibitor (IW) to the catalyst (CW) is in a range of 1.3 to 4.

8. The curable composition according to claim 1, further comprising an isocyanate compound.

9. The curable composition according to claim 8, wherein the isocyanate compound has an isocyanate value by the following equation 4 in a range of 0.001 to 0.1:

$$NCOV=NCO/MN \qquad [\text{Equation 4}]$$

wherein, NCOV is the isocyanate value, NCO is a number (molar number) of isocyanate groups in the isocyanate compound, and MN is a molar mass of the isocyanate compound.

10. The curable composition according to claim 9, wherein the isocyanate compound has a molar mass in a range of 60 to 300 g/mol.

11. The curable composition according to claim 8, wherein the isocyanate compound is present such that $R_2$ in the following equation 5 is in a range of 10 to 150:

$$R_2=(W1\times O/M)/(NCOV\times W3) \qquad [\text{Equation 5}]$$

wherein, O is a hydroxyl value of the polyol, NCOV is an isocyanate value of the isocyanate compound, W1 is a weight ratio of the polyol to the isocyanate compound, and W3 is a weight ratio of the isocyanate compound to the polyol.

12. The curable composition according to claim 8, wherein the isocyanate compound is present such that $R_3$ in the following equation 6 is in a range of 50 to 500:

$$R_3=(FV\times W2)/(NCOV\times W3) \qquad [\text{Equation 6}]$$

wherein, FV is a reaction-inhibitory functional value of the reaction inhibitor, NCOV is an isocyanate value of the isocyanate compound, W2 is a weight ratio of the reaction inhibitor to the isocyanate compound, and W3 is a weight ratio of the isocyanate compound to the reaction inhibitor.

13. A battery module comprising:
a module case having an internal space;
a plurality of battery cells in the internal space of the module case; and
a resin layer comprising a cured product of the curable composition of claim 1,
wherein the resin layer in the internal space is in contact with the plurality of battery cells and the module case.

14. A battery pack comprising two or more battery modules of claim 12 that are electrically connected to each other.

* * * * *